(12) United States Patent
Ho et al.

(10) Patent No.: US 6,877,933 B2
(45) Date of Patent: Apr. 12, 2005

(54) PELLET FEEDING SYSTEM FOR A MOLDING MACHINE

(75) Inventors: Shu Chuen Ho, Singapore (SG); Teng Hock Kuah, Singapore (SG); Jie Liu, Singapore (SG)

(73) Assignee: ASM Technology Singapore Pte. Ltd., Singapore (SG)

( * ) Notice: Subject to any disclaimer, the term of this patent is extended or adjusted under 35 U.S.C. 154(b) by 162 days.

(21) Appl. No.: 09/957,103

(22) Filed: Sep. 20, 2001

(65) Prior Publication Data

US 2003/0054067 A1 Mar. 20, 2003

(51) Int. Cl.⁷ .............................................. B65G 51/30
(52) U.S. Cl. ........................ 406/180; 406/84; 406/152
(58) Field of Search .......................... 406/28, 84, 151, 406/152, 168, 180

(56) References Cited

U.S. PATENT DOCUMENTS

| | | | | |
|---|---|---|---|---|
| 4,178,662 A | * | 12/1979 | Borodin | 445/67 |
| 4,947,903 A | * | 8/1990 | Beckwith | 141/67 |
| 5,656,305 A | | 8/1997 | Venrooij | 425/145 |
| 6,210,080 B1 | * | 4/2001 | Haul et al. | 406/13 |
| 6,325,572 B1 | * | 12/2001 | Dietrich | 406/171 |
| 6,379,086 B1 | * | 4/2002 | Goth | 406/75 |
| 6,413,020 B1 | * | 7/2002 | Davison | 406/168 |
| 6,634,833 B2 | * | 10/2003 | Gillespie | 406/84 |

* cited by examiner

Primary Examiner—Joe Dillon, Jr.
(74) Attorney, Agent, or Firm—Ostrolenk, Faber, Gerb & Soffen, LLP

(57) ABSTRACT

A feeding system (10) for epoxy mould compound (EMC) pellets which has a supply bowl (12) situated outside the clean environment (24) of a conventional automatic moulding machine (26). A tube (16) extends from the supply bowl (12) to a buffer hopper (14) within the clean environment and which is located above the feeder bowl (28) of the automatic moulding machine (26). EMC pellets are transported through the tube (16) from the supply bowl (12) into the buffer hopper (14) via a vacuum suction system (34), (36) which is connected to the tube (16) in proximity to the buffer hopper (14). A counter air flow may be provided to slow the speed of the pellets as they enter the buffer hopper. Batches of the pellets accumulated in the buffer hopper (14) are periodically released into the feeder bowl (28) of the automatic moulding machine (26). The vacuum transportation system reduces dust from the pellets. Also productivity is increased compared to conventional use of the automatic moulding machine (26) by providing for the supply bowl (12) to have a significantly larger capacity compared to the feeder bowl (28) of the automatic moulding machine (28).

10 Claims, 2 Drawing Sheets

PELLET FEEDING SYSTEM FOR A MOLDING MACHINE

TECHNICAL FIELD

The present invention relates to a feeding system for epoxy mould compound (EMC) pellets for an automatic moulding machine, for example for encapsulating integrated circuit (IC) packages.

BACKGROUND

EMC pellets are a source of contamination in clean IC manufacturing environments because they can crumble and thus generate epoxy mould compound dust. It is highly desirable therefore to locate an EMC pellet supply or a moulding machine as much as possible outside the clean environment of the machine so as to reduce the amount of epoxy mould compound dust that may be generated within that environment from such pellets.

Thus U.S. Pat. No. 5,656,305 (Venrooij), for example, discloses a system for dosed conveying and selecting of pellets for a moulding apparatus for lead frames in which a supply-feed device and in-feed and selection device of the system are located in a housing in order to obtain a separation between a high dust level and a low dust level environment. This system selects and successively conveys pellets one by one to a transporting path which extends outside the housing. Towards the end of the transporting path and in the low dust level environment, the pellets are individually braked, separated and then transferred to carrier which conveys them to a mould of the moulding apparatus. The system of this U.S. Patent however is quite complex because of the individualisation of the pellets at the supply-feed end and through to their conveyance into a mould, which necessitates the provision of specialist equipment, particularly for the moulding machine. It does not address the supply of EMC pellets to a conventional automatic moulding machine having a pellet feeder bowl that is inbuilt into the automatic moulding machine.

DISCLOSURE OF THE INVENTION

An object of the present invention is to provide a system for feeding EMC pellets from a location outside a clean environment for supplying a conventional automatic moulding machine within the clean environment.

Accordingly, the invention provides a feeding system for epoxy mould compound (EMC) pellets comprising a supply bowl for storing EMC pellets, a buffer hopper for location over a feeder bowl of an automatic moulding machine within a clean environment, the supply bowl being locatable away from the buffer hopper and thus the clean environment, a tube connected between the supply bowl and the buffer hopper through which EMC pellets are transportable, the tube including an outlet in proximity to the buffer hopper for connection of a suction means to the tube for establishing vacuum conditions within the tube for transporting EMC pellets from the supply bowl to the buffer hopper, wherein the buffer hopper accumulates a quantity of so transported EMC pellets for release into a feeder bowl of an automatic moulding machine.

An advantage of the invention, in addition to the primary supply of the pellets (which generates EMC dust) being locatable outside the clean environment, is that the use of a suction means reduces the amount of such dust within the feeding system and which could be conveyed into the clean environment. Thus the invention provides a "clean" feeding system for the EMC pellets.

Preferably the buffer hopper includes an orifice for admission of air such that said conditions within the tube include an air flow from the buffer hopper to the outlet for slowing the movement of individual EMC pellets as they approach the buffer hopper after passing the outlet. This feature also assists in reducing EMC dust within the feeding system because it smoothes the handling of the pellets, that is, it reduces impact forces on the pellets.

Preferably the supply bowl has a large capacity relative to the capacity of a feeder bowl of an automatic moulding machine. For example the capacity of the supply bowl may be about six times the capacity of a feeder bowl. This feature further reduces pellet dust and increases productivity because it reduces the frequency of pellet loading at the supply bowl compared to conventional practice, which involves loading at the feeder bowl of an automatic moulding machine.

For a better understanding of the invention and to show how the same may be carried into effect, a preferred embodiment thereof will now be described, by way of non-limiting example only, with reference to the accompanying drawings.

DETAILED DESCRIPTION

Figure 1:
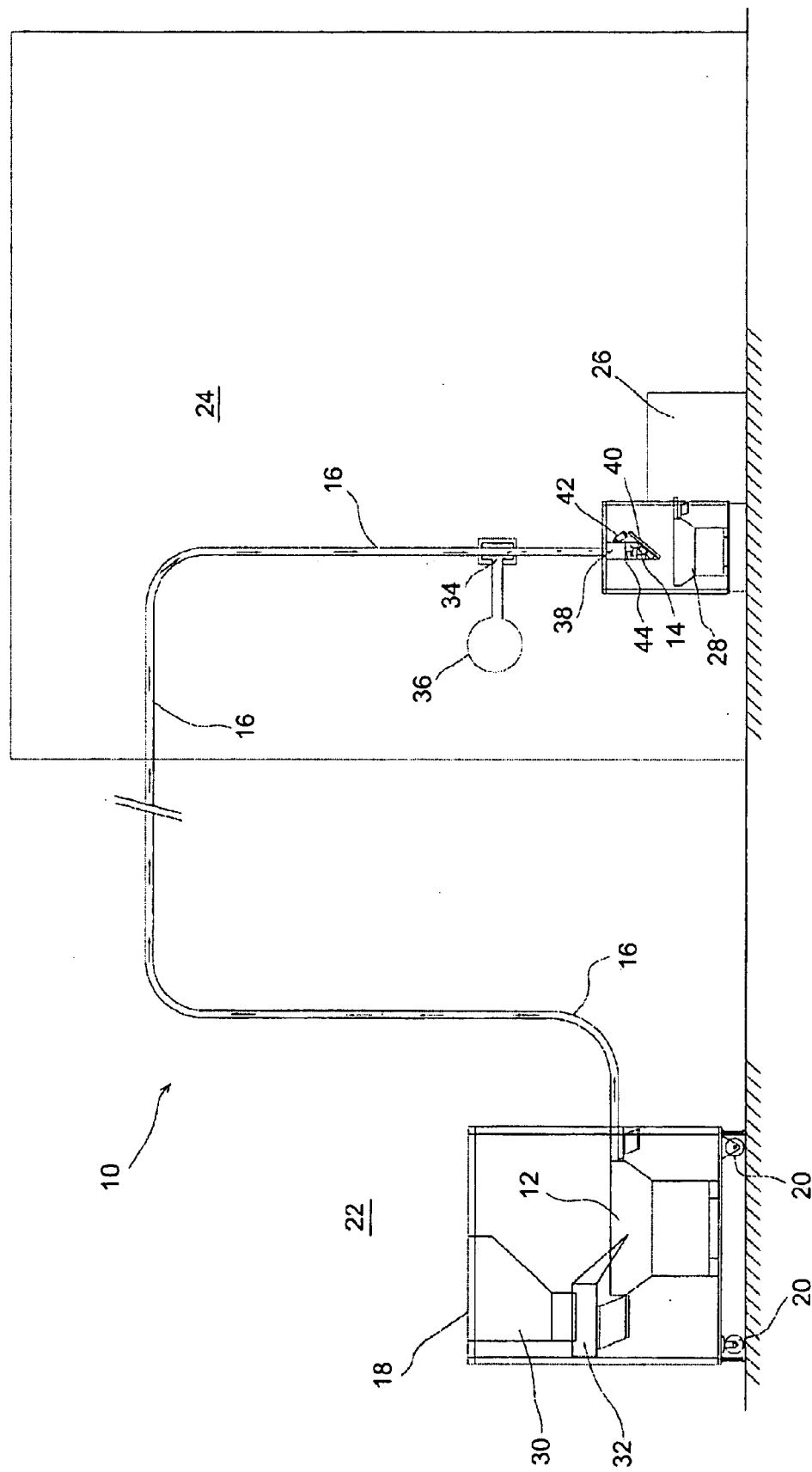
FIG. 1 schematically illustrates a feeding system for EMC pellets according to a preferred embodiment of the invention.

A feeding system 10 for EMC pellets comprises a supply 12 and a buffer hopper 14 interconnected by a tube 16 through which EMC pellets are transportable. The supply bowl 12 is part of a pellet supply apparatus 18 that is mobile per wheels 20 and is locatable in an environment 22 that is outside or remote from the clean environment 24 of a conventional automatic moulding machine 26. Machine 26 is preferably for encapsulation of IC devices. It includes a feeder bowl 28 over which the buffer hopper 14, in use of the feeding system 10, is located.

Pellet supply apparatus 18 includes a hopper 30 into which a stock of EMC pellets is loaded. A hopper feeder 32 feeds pellets from the hopper 30 and into the supply bowl 12.

Figure 2:
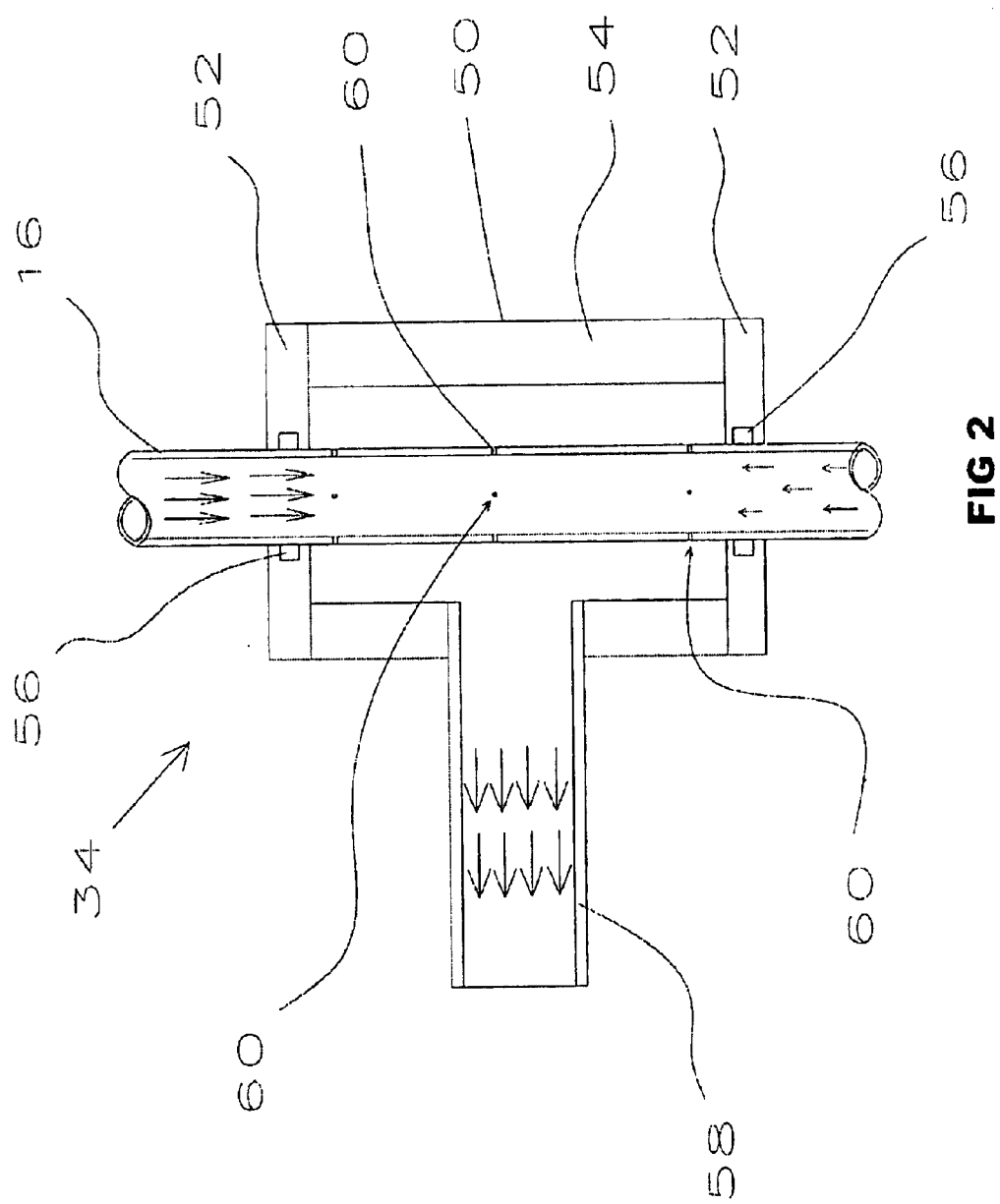
FIG. 2 schematically illustrates a vacuum suction outlet of the system of FIG. 1.

Tube 16 includes an outlet 34 which is proximate to the buffer hopper 14 end of the tube 16. Outlet 34 (see FIG. 2) comprises a housing 60, made up of end plates 62 and side wall 54, which surrounds tube 16 and is sealed relative thereto by seals 56 in the end plates 52. A conduit 58 extends from the side wall 54 of housing 50 for connection to a suction means (as further described hereinbelow). Tube 16 includes numerous small holes 60 between the end plates 52. The holes 60, which may be about 0.5–1.00 mm diameter, may number between 10 to 20 spaced around and along the tube 16. A suction means 36, for example a vacuum pump, is connectable to the conduit 58 of outlet 34 for establishing vacuum conditions within the tube 16 such that EMC pellets within the supply bowl 12 are drawn into tube 16 and transported to the buffer hopper 14. The buffer hopper 14 includes an orifice 38 through which air is drawn to provide an air flow from the buffer hopper 14 towards the outlet 34, that is, in a direction against the direction of movement of pellets therein for slowing the speed of movement of individual pellets as they approach the buffer hooper 14. This reduces impact forces on the pellets as they enter the buffer hopper 14 and so contributes to reducing the generation of contaminating dust from the pellets. It also extracts dust generated from the pellets in the buffer hopper 14 away from the buffer hopper 14.

The buffer hopper 14 includes a door 40 which closes the buffer hopper 14 at its base and which is operable via a pneumatic mechanism 42, for example a piston and cylinder arrangement. It will be understood of course, that the vacuum conditions within the tube 16 for transport of the EMC pellets will be generated only while door 40 is closed. Once a pellet is supplied to the entrance of the tube 16 from bowl 12, the vacuum is built and thus transfers the pellet to the buffer hopper 14 (the supply bowl 12 remains open to atmosphere). Associated with the buffer hopper 14 is a level senesor 44 which, upon the buffer hopper 14 having accumulated a quantity of the EMC pellets transported thereinto via the tube 16 to a predetermined level, generates a signal which is operative to initiate the pneumatic mechanism 42 to open the door 40 to release a batch of the EMC pellets from the buffer hopper 14. Due to gravity, these pellets are disposed into the feeder bowl 28 located beneath the buffer hopper 14. The door 40 may be arranged to close after all the accumulated EMC pellets in the buffer hopper 14 have been released or to close after a predetermined period of time.

Preferably the supply bowl 12 has a capacity which is about six times the capacity of the feeder bowl 28 of the automatic moulding machine 26. This feature reduces the frequency of pellet loading compared to conventional arrangements and thus assists in reducing the level of dust from the pellets and increases productivity (because less frequent pellet loading is required).

Although the door 40 of the buffer hopper 14 is preferably periodically operable for disposal by gravity of a batch of the accumulated EMC pellets from the hopper via level sensor 44 initiating operation of the pneumatic mechanism 42, other arrangements are possible. Thus, for example, opening of door 40 could be initiated by sensing the weight of pellets in the buffer hopper 14, or on a timing basis. Furthermore door 40 could be operated via other than a pneumatic mechanism 42. Thus door 40 could be operable for example via an electric mechanism.

According to an embodiment of the invention for use with EMC pellets of diameter between 10 to 20 mm, the outlet 34 is located less then 350 mm from the buffer hopper 14 and the feeding system 10 is designed to handle a vacuum level of up to 150 millibar with a maximum flow rate of 25 m³/hr. This system allows the mobile supply apparatus 18 to be located up to 30 meters away from the moulding machine feeder bowl 28.

The invention described herein is susceptible to variations, modifications and/or additions other than those specifically described and it is to be understood that the invention includes all such variations, modifications and/or additions which fall within the scope of the following claims.

What is claimed is:

1. A feeding system for delivering a molding compound in pelletized form which generates dust during transportation from outside a clean environment to an automatic molding machine located inside the clean environment, the feeding system comprising:
   a supply bowl located outside the clean environment configured to store the molding compound;
   a buffer hopper located within the clean environment which is constructed and positioned for communication with a feeder bowl of the automatic molding machine;
   a tube having an upstream end connected to the supply bowl and a downstream end connected to the buffer hopper which transports the molding compound from the supply bowl to the buffer hopper with substantially no contamination of the clean environment due to release of dust; and
   a suction device connected to the tube through a coupler located in proximity to the buffer hopper,
   wherein:
   the downstream end of the tube is connected to a closure mechanism which permits the suction device to establish vacuum conditions within the tube for transporting the molding compound from the supply bowl to the buffer hopper, and
   the closure mechanism is operable to accumulate a quantity of molding compound transported from the supply bowl in the buffer hopper for release into the feeder.

2. A feeding system as claimed in claim 1 wherein the buffer hopper includes an orifice for admission of air to provide air flow from the buffer hopper to the coupler for slowing the movement of individual molding compound pellets as they approach the buffer hopper after passing the coupler.

3. A feeding system as claimed in claim 1 wherein the supply bowl has a large capacity relative to the capacity of the feeder bowl.

4. A feeding system as claimed in claim 3 wherein the capacity of the supply bowl is about six times the capacity of the feeder bowl.

5. A feeding system as claimed in claim 1, wherein the buffer hopper includes a door operable to release batches of accumulated pellets of the molding compound therefrom into the feeder bowl.

6. A feeding system as claimed in claim 5 wherein is selectively operable to permit gravity feed of a batch of the accumulated pellets of the molding compound from the buffer hopper into the feeder bowl.

7. A feeding system as claimed in claim 6 further comprising an operating mechanism for the door, and a level sensor associated with the buffer hopper and which provides an indication when the transported molding compound pellets accumulate to a predetermined level in the buffer hopper, the door operating mechanism being responsive to the indication from the level sensor to initiate opening of the door.

8. A feeding system as claimed in claim 7 wherein the door operating mechanism is pneumatically operable.

9. A feeding system as claimed in claim 1 wherein:
   the buffer hopper is connected to the tube by the coupling device; and
   the buffer hopper includes a door which is operable to close the downstream end of the tube to permit the suction device to establish the vacuum conditions within the tube.

10. A feeding system as claimed in claim 9 wherein the door on the buffer hopper is selectively openable to release the quantity of molding compound pellets accumulated in the buffer hopper.

* * * * *